(12) United States Patent
Hoetzel et al.

(10) Patent No.: US 6,373,375 B1
(45) Date of Patent: Apr. 16, 2002

(54) METHOD FOR DATA TRANSMISSION IN A VEHICLE

(75) Inventors: Juergen Hoetzel, Michelstadt; Ega Tschiskale, Hoppetenzell, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/355,537
(22) PCT Filed: Jan. 24, 1998
(86) PCT No.: PCT/DE98/00216
§ 371 Date: Nov. 17, 1999
§ 102(e) Date: Nov. 17, 1999
(87) PCT Pub. No.: WO98/33677
PCT Pub. Date: Aug. 6, 1998

(30) Foreign Application Priority Data

Jan. 29, 1997 (DE) .......................................... 197 03 144

(51) Int. Cl.[7] .............................................. H04M 11/04
(52) U.S. Cl. ............................. 340/310.01; 340/310.07; 340/870.01
(58) Field of Search .................. 340/310.01, 310.02, 340/310.05, 310.07, 310.08, 825.06, 538, 431, 870.01, 825.07; 307/10.1, 10.6, 9.1

(56) References Cited

U.S. PATENT DOCUMENTS

| | | | | |
|---|---|---|---|---|
| 4,404,541 A | | 9/1983 | Masao et al. | |
| 4,661,718 A | * | 4/1987 | Matsumoto et al. | ....... 307/10.1 |
| 4,937,796 A | | 6/1990 | Tendler | |
| 5,039,038 A | * | 8/1991 | Nichols et al. | .......... 340/825.5 |
| 5,142,278 A | * | 8/1992 | Moallemi et al. | ...... 340/310.01 |
| 5,469,150 A | * | 11/1995 | Sitte | ..................... 340/870.01 |
| 5,818,127 A | * | 10/1998 | Abraham | ............... 340/310.07 |
| 6,130,487 A | * | 10/2000 | Bertalan et al. | ......... 340/310.1 |

FOREIGN PATENT DOCUMENTS

DE 196 31 694 6/1997

* cited by examiner

Primary Examiner—Van T. Trieu
(74) Attorney, Agent, or Firm—Kenyon & Kenyon

(57) ABSTRACT

A method for data transmission from control devices to a display, which also makes possible retrofitting of a reversing aid system since it transmits the data via existing supply line(s) of further electrical loads.

9 Claims, 5 Drawing Sheets

METHOD FOR DATA TRANSMISSION IN A VEHICLE

BACKGROUND INFORMATION

Control devices which analyze the data from sensors and forward them to a display are used for reversing aids in a vehicle. Cables separate from the rest of the electrical system are incorporated into the vehicle for data transmission from the control device to the display, which must be placed at a location accessible to the driver. This means additional outlay in terms of cost and working time when a vehicle is manufactured. In a situation in which a reversing aid is to be retrofitted into a vehicle, cable routing is again the actual problem, as known from the article "Pilot project" [Pilotprojekt], Gute Fahrt 10/91, pp. 50–53. The outlay is particularly great if a tractor vehicle having a trailer or semitrailer is to be equipped with reversing aids. The coupling of the trailer and its electrical connection via a special cable, e.g. a helical cable with a waterproof connector, particularly increases the outlay.

SUMMARY OF THE INVENTION

The method according to the present invention for data transmission, has, in contrast, the advantage of resorting to existing cable runs in the vehicle. Especially in the case of possible retrofitting of a vehicle with a reversing aid, it is much simpler to use the already existing cable runs as data lines and supply lines for the control devices.

The simplest possibility for data transmission is via the electrical supply line to which the control devices are also connected. It is particularly advantageous in this context if the lines for loads such as, for example, the reversing lights are used as the electrical supply line. This has the advantage that the control device is supplied with voltage only in a situation in which the vehicle is moving backward. The switch already present in the vehicle for reverse gear then serves to switch the control device on and off.

Data transmission can also be accomplished via a further electrical supply line which does not supply power to the control devices themselves.

In a further embodiment, the data transmission line selected is an electrical supply line, e.g. the two-wire line, of a directional indicator. Advantageously, the supply line for the reversing light is also selected for data transmission via a two-wire line. For data transmission via the directional indicator line, the loads, i.e. the directional indicators, need not be in operation. Another advantageous embodiment transmits the data symmetrically over both directional indicator lines that are present.

For use in a vehicle that has a tractor vehicle and a trailer, it is advantageous if only a first control device is authorized to forward data. The further control devices that are connected interrupt their data transmission if they detect a further control device.

Advantageous monitoring of the second control device to determine whether a first control device is connected is accomplished, for example, by eavesdropping on the signals of the first device in the data stream. For this purpose, the second control devices are equipped with a time delay. In this delay time, they eavesdrop on data that the first control device is sending immediately.

It is furthermore possible to detect a first control device by measuring the current of the electrical load.

All known transmission techniques can be used as the modulation and coding method, but frequency shift keying is preferably used.

DETAILED DESCRIPTION

Figure 1:
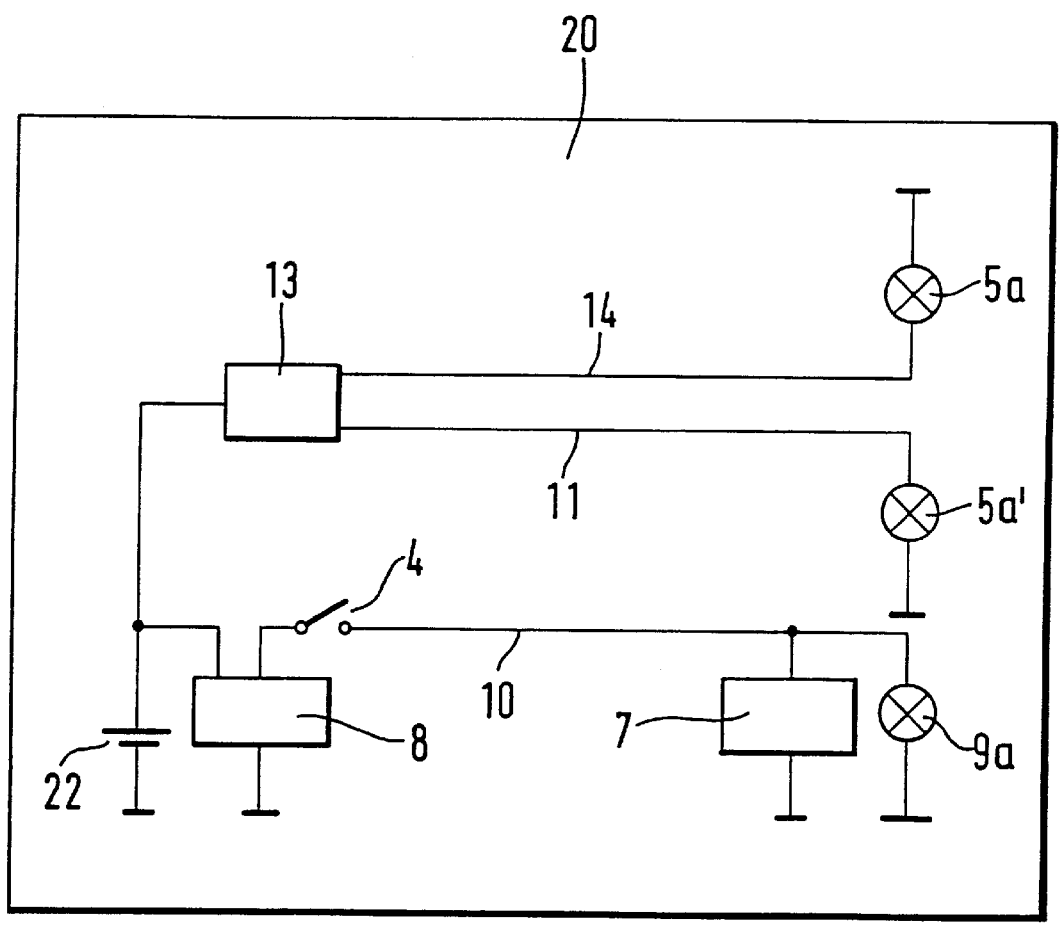
FIG. 1 shows an exemplary embodiment where the data passes via the supply line of the control device.

FIG. 1 shows a vehicle 20 that is equipped with a reversing aid. Control device 7 for the reversing aid is located at the rear of vehicle 20 and is connected to sensors (not illustrated) which sense the distance to an obstacle. Control device 7 is connected to electrical supply line 10 for reversing light 9a. Located in line 10 is switch 4 which, when the vehicle is moving backward, establishes contact to power supply unit 22, generally the battery. Supply line 10 is also connected to display 8 for the reversing aid. Further supply lines 11 and 14 are connected to battery 22 via directional indicator relay 13, and provide power to directional indicators 5a and 5a'.

When vehicle 20 is backing up, switch 4 for reversing light 9a is also closed. Control device 7 and display 8 are then supplied with voltage from battery 22. The signals going to the control device from the sensors (not depicted) are analyzed in the control device and must be sent on to display 8. The data are forwarded serially via electrical supply line 10 (a two-wire supply line) to display 8.

Figure 2:
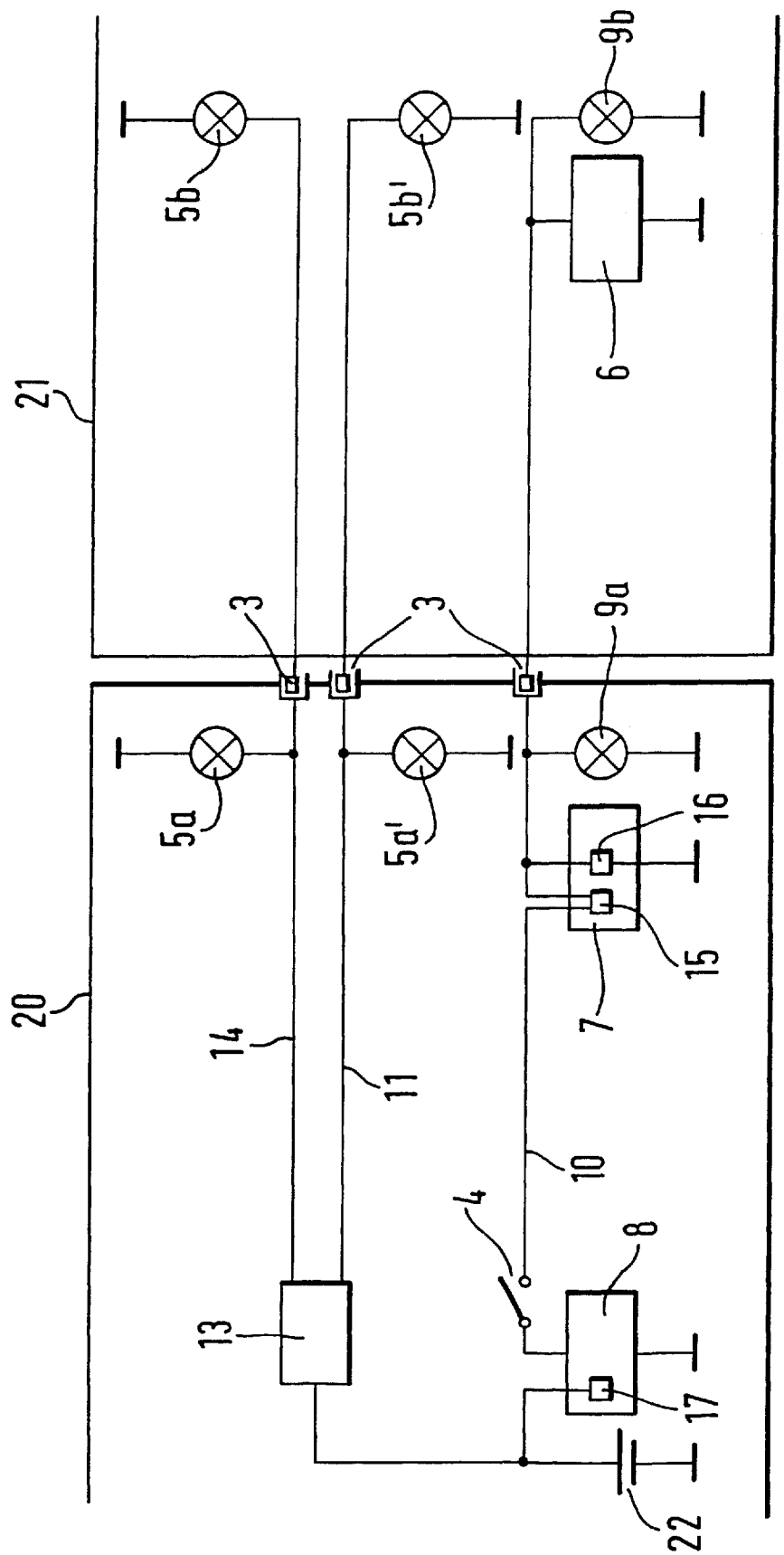
FIG. 2 shows an exemplary embodiment which includes a trailer having a second control device is also involved.

FIG. 2 schematically shows the circuit in a vehicle 20 and a trailer 21. The individual components have already been described in FIG. 1. Coupling of the tractor vehicle to trailer 21 is accomplished via plug connections 3. In addition to control device 7 present in tractor vehicle 20, control device 6 of trailer 21 is located in the continuation of supply line 10. Electrical supply line 10 supplies voltage both to reversing light 9a of tractor vehicle 20 and to reversing light 9b of trailer 21. Installed inside display 8 is a detector 17 for a current measurement system. Located inside control device 7 are detectors 15 for a current measurement system or for a modulation measurement system 16.

When the vehicle is traveling backward, switch 4 for the reversing lights is closed. Both reversing lights 9a and 9b are thus in operation. Both control devices—control device 7 in tractor vehicle 20 and control device 6 in trailer 21—analyze data that are furnished from external sensors (not illustrated). Initially, all the control devices located in supply line 10 transmit their data to display 8. All the data that are transmitted by the control devices via the supply line are impressed onto the supply line by current modulation or voltage modulation. All known techniques are possible as modulation methods and coding methods, taking into account the transmission properties of the lines. A transmission method which meets applicable EMC specifications must, however, be used. A frequency shift keying (FSK) method is advantageous, since it causes only minor electromagnetic interference in the frequency range up to 10 kHz. It is particularly advantageous to use a pulsed FSK method, since transmission is thereby reliable while the current load is minimal and the functional influence of the loads is not measurable. The frequency spectrum of active electromagnetic interference is also limited to a narrow band.

In FIG. 2, data from control devices 7 and 6 are being transmitted over supply line 10. As soon as more than one control device is present in a vehicle, the control devices must be prevented from transferring data simultaneously to the display, thus causing confusion. Communication between the control devices and the display is initially realized as one-way communication between a control device and a display. As soon as vehicle 20 has a trailer 21, actions must be taken to prevent both control devices from simultaneously transmitting data via supply line 10. In the simplest case, this must be done by defining a ranking of the two control devices. In the simplest case, control device 7 is defined at the factory as the control device of a tractor vehicle, and control device 6 as the control device of a trailer. If only control device 7 in the tractor vehicle is present, the control device begins to receive signals from its sensors as soon as supply line 10 is closed via switch 4. Since this is the control device of the tractor vehicle, it possesses an internal time delay circuit which prevents the received data from being immediately forwarded via line 10 to the display, and which buffers the data. Once the internal time delay has elapsed, the data buffered in control device 7 are transmitted to the display.

If a trailer 21 is coupled to trailer vehicle 20, control device 7 initially knows nothing about the presence of control device 6. Control device 6 is designed so that it contains no time delay for the transmission of data from the sensors to the display. As soon as the vehicle with trailer backs up and the switch for reversing lights 9a and 9b is closed, the control device begins to collect data from its sensor and transmit them via line 10 to the display. Control device 7 has a time delay, and in the meantime collects data from its sensors. Simultaneously, control device 7 eavesdrops by way of a detector 16 on signals that are impressed onto supply line 10. Since the control device in trailer 21 immediately begins to transmit data, these data from control device 7 on line 10 are recognized. Control device 7 is immediately muted, and transitions into a check function which simply monitors data transmission on supply line 10. When trailer 21 is uncoupled, no further signals arrive from control device 6. If the vehicle then backs up, control device 7 once again collects data from its sensors, buffers it during the delay time, and forwards it to display 8, since no data are detectable on supply line 10.

The assignment of a particular control device in one vehicle to a particular position need not be made via hardware configuration. Solutions using pin coding of the control device terminals are also conceivable, so that the devices recognize by way of their connections the position at which they are being used in the vehicle.

Detection of control device 6 can also be accomplished via a different method. For this, a current measurement 15 is performed in control device 7. The measurement is accomplished on the common supply line 10 for the control devices. The current measurement which detects the additional power consumption of control device 6 can also be made via a sensor 17 which can be located either in the display or at one of the loads, e.g. directional indicators 9a and 9b.

Figure 3:
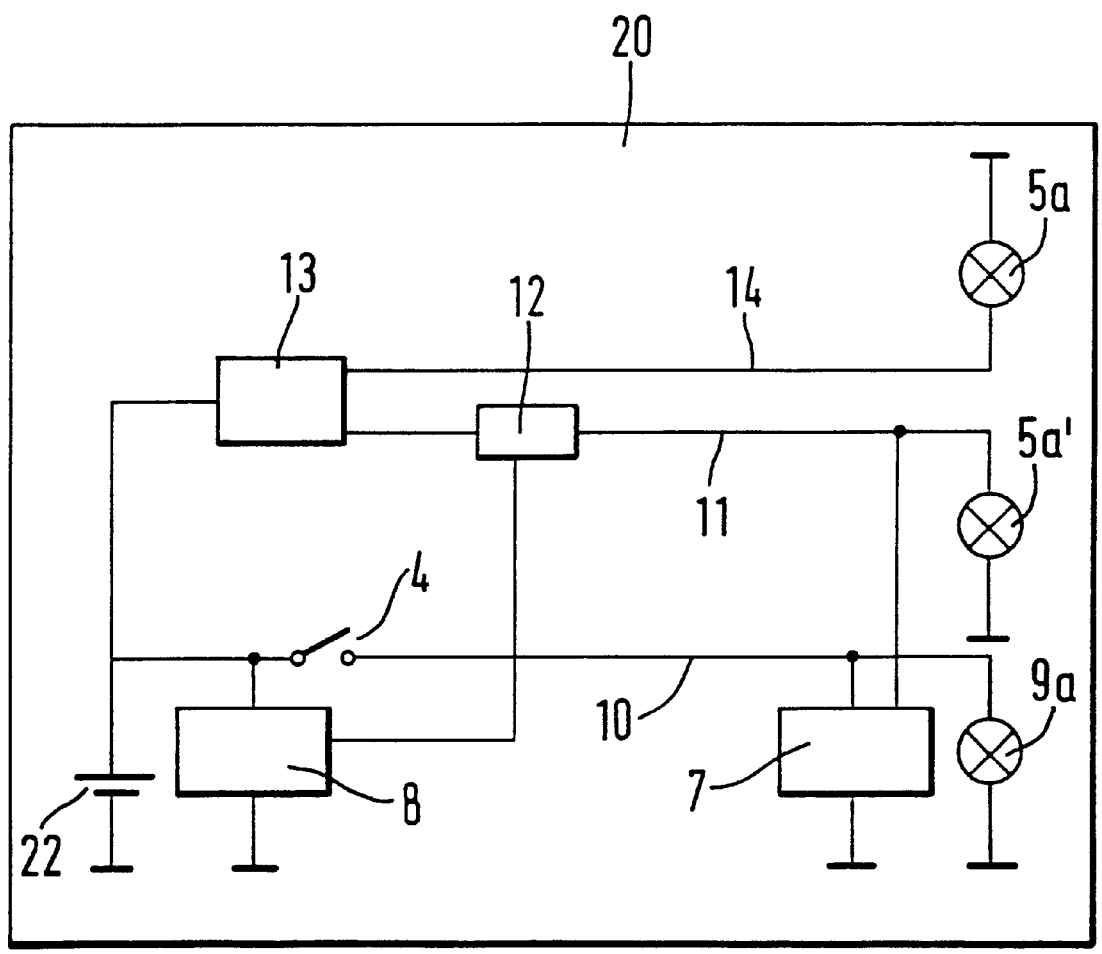
FIG. 3 shows an exemplary embodiment which includes data transmission via the directional indicator lines.

FIG. 3 shows the circuit in a tractor vehicle 20, for an alternative transmission method. The individual components correspond to the constituents already described in FIG. 1. Control device 7, which is supplied with voltage via electrical supply line 10, is supplied with voltage when switch 4 is closed, i.e. when the vehicle is backing up. The signals from the sensors of the reversing control device are delivered by control device 7 onto supply line 11 of right-hand directional indicator 5a'. Upstream from directional indicator relay 13, signal converter 12 taps the signal from supply line 11 and forwards the signal to display 8. The data are forwarded via electrical supply line 11 even when electrical loads 5a and 5a' (the directional indicators) are not in operation, since directional indicator relay 13 is not located within the transmission section.

Figure 4:
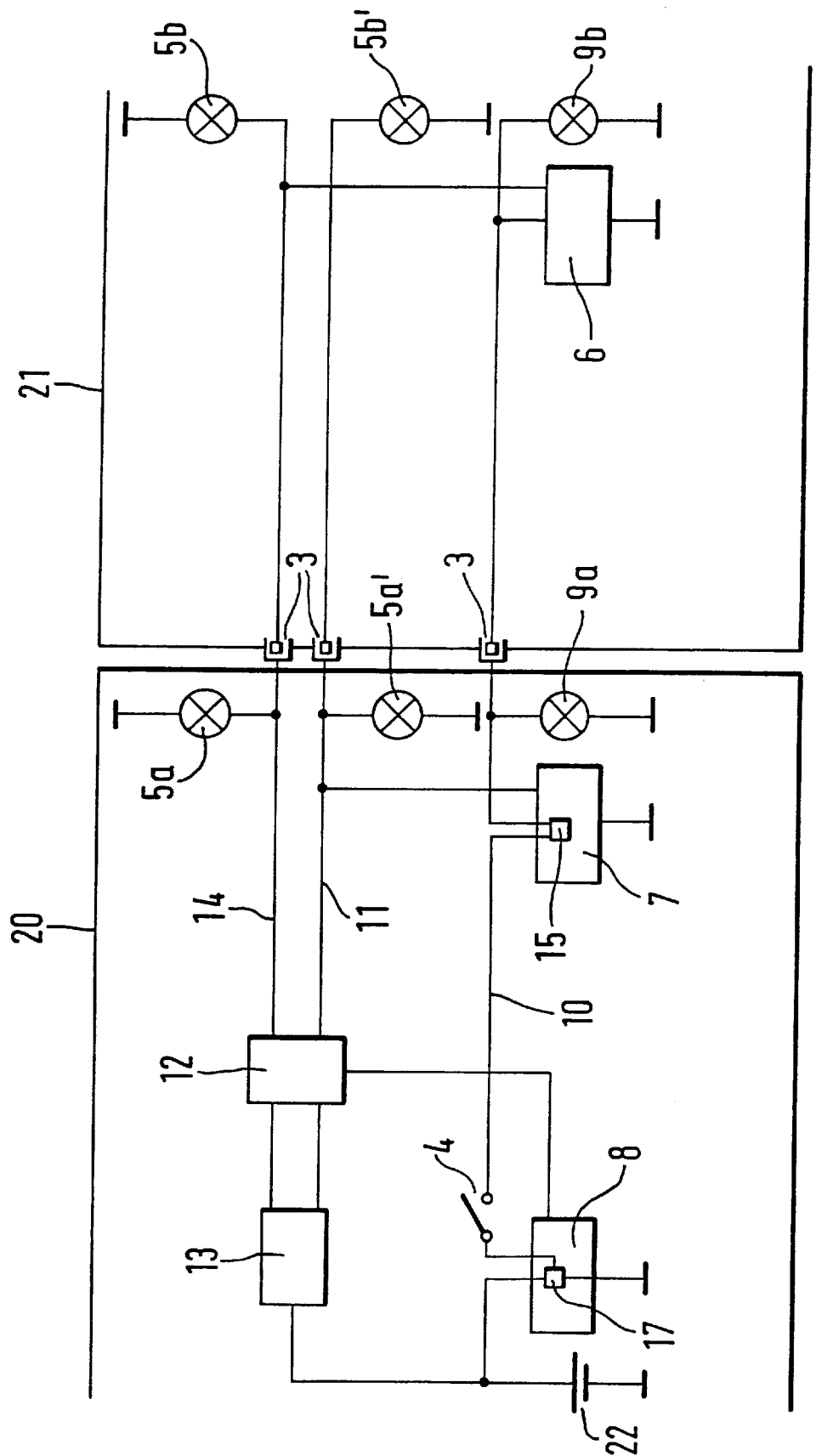
FIG. 4 shows an exemplary embodiment which includes a trailer operation.

FIG. 4 depicts the circuit for the case of operation with a trailer. The components of the circuit have already been described in detail in FIG. 2. In this exemplary embodiment, the data from control device 6, which is located in trailer 21, are forwarded via supply line 14 of directional indicator 5b, while the data from control device 7 in the tractor vehicle are transmitted via supply line 11 of directional indicator 5a'. In this exemplary embodiment, it is not necessary for control devices 6 and 7 to know about one another. The two control devices can transmit data via the separate supply lines 11 and 14. Signal converter 12 detects the signals, and forwards to the display only the data from control device 6 that are arriving over supply line 14.

Alternatively, the power consumption on line 10 is detected either by control device 7 via sensor 15, or by display 8 via sensor 17, so that control device 7 can be muted when the power consumption of control device 6 is detected.

Figure 5:
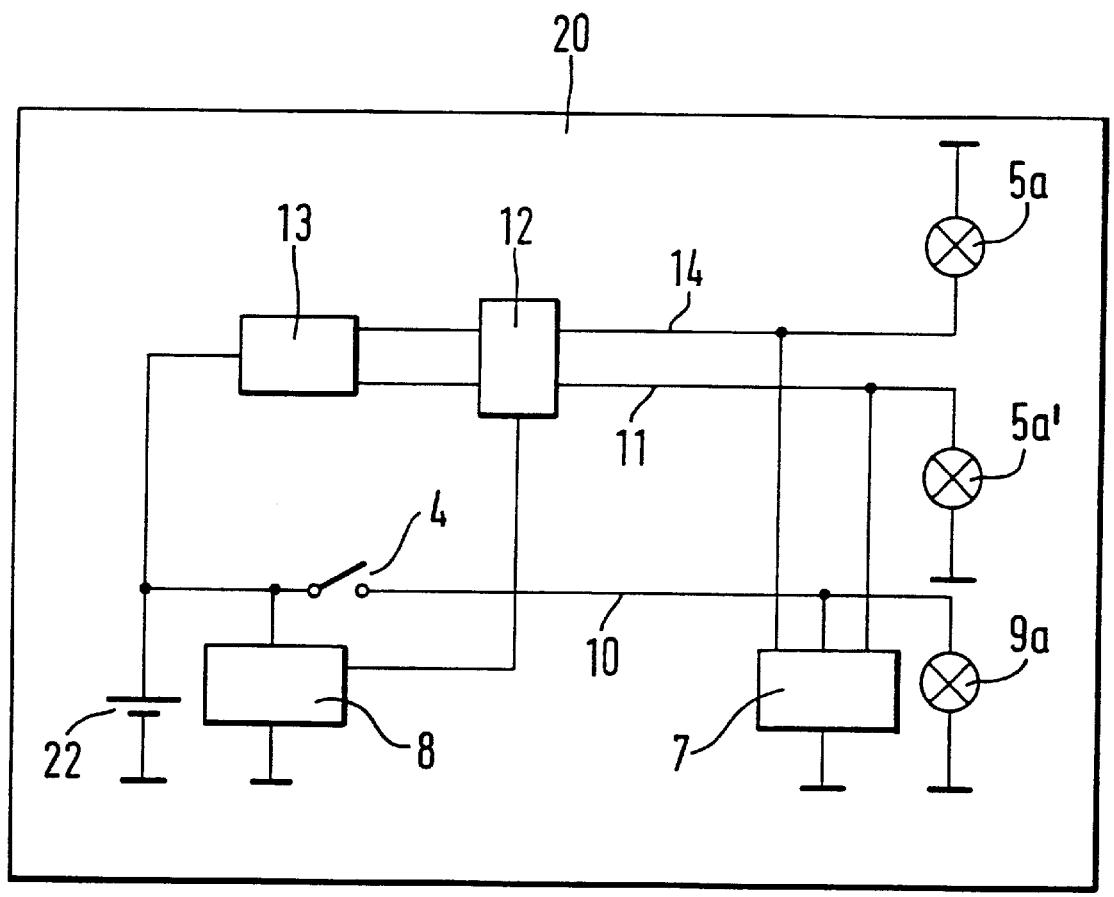
FIG. 5 shows an exemplary embodiment which includes symmetrical data transmission.

FIG. 5 shows an exemplary embodiment with symmetrical data transmission. The reference characters are once again used by analogy with FIG. 1. The data from the reversing sensors are received by control device 7 and transmitted symmetrically via lines 11 and 14. Signal converter 12 receives the data and forwards them to display 8.

The exemplary embodiments described so far describe simple one-way communication between a control device and a display. Also conceivable as a way to carry out the present invention is a double-way communication system, data being exchanged among all the components. A prerequisite for double-way communication is the fact that the respective control devices must know their positions in the tractor or trailer. Position definition can be accomplished by installing specified devices, or by installation at a coding plug. It is also possible to begin an initialization phase, in which the control devices discern an obstacle arrangement from which they themselves recognize the positions at which they are located. One simple possibility for double-way communication is for display unit 8 to activate the respective control device 7 or 6, and for the corresponding control device to begin sending data only after it has been polled by display 8. In this case, the display would first poll the control device of trailer 21. If it is present, it begins in turn to transmit information. If it does not reply, shortly thereafter the display unit polls the control device of the tractor, which only now becomes active. A prerequisite for this type of communication is that all the units must be able to send as well as receive. The control devices can be identical; the difference between them consists in suitable software. The control devices have learned, during the initialization phase, the position at which they are located, and thus also the code to which they must react when queried by the display. Double-way communication offers the possibility of connecting a diagnostic device in order to perform rapid fault analysis.

What is claimed is:

1. A method for transmitting data by a plurality of control devices in a vehicle which receive and analyze the data for a reversing aid, comprising the steps of:

transmitting the data to be displayed from the control devices to a display unit in the vehicle via at least one display unit electrical supply line;

supplying the control devices with power via at least one control device electrical supply line of an electrical load in the vehicle; and defining a ranking of the control devices for transmitting the data.

2. The method according to claim 1, wherein the at least one display unit electrical supply line and the at least one control device electrical supply line are the same line.

3. The method according to claim 1, wherein the at least one control device electrical supply line includes a first line of the electrical load and the at least one display unit electrical supply line includes a second line of a further electrical load, the first line being different from the second line.

4. The method according to claim 1, wherein the at least one display unit electrical supply line includes a plurality of electrical supply lines corresponding to the plurality of control devices for separately transmitting the data of the plurality of control devices.

5. The method according to claim 1, wherein the control devices include a first control device and a second control device, the first control device being situated at an end of a supply line, the first control device beginning a data transmission after an initialization, the second control device beginning a data transmission after a delay period if the second control device is not detected by the first control device.

6. The method according to claim 5, wherein, after the delay period, the second control device detects the data on at least one supply line by way of a detection system, and is muted after detecting the data of the first control device.

7. The method according to claim 5, wherein, within the delay period, the second control device detects an additional power consumption on a supply line, and is muted after detecting the additional power consumption by the first control device.

8. The method according to claim 5, wherein voltage is supplied to the plurality of control devices only when the vehicle is moving in a reverse direction.

9. The method according to claim 1, further comprising the step of modulating the data using a frequency shift keying technique.

* * * * *